US009982323B2

(12) United States Patent
Voigt (10) Patent No.: US 9,982,323 B2
(45) Date of Patent: May 29, 2018

(54) RECOVERY OF ZINC FROM LEAD SLAG (71) Applicant: GLENCORE QUEENSLAND LIMITED, Brisbane, Queensland (AU)

(72) Inventor: Paul Voigt, Brisbane (AU)

(73) Assignee: Glencore Queensland Limited, Brisbane (AU)

( * ) Notice: Subject to any disclaimer, the term of this patent is extended or adjusted under 35 U.S.C. 154(b) by 379 days.

(21) Appl. No.: 14/420,634

(22) PCT Filed: Aug. 6, 2013

(86) PCT No.: PCT/AU2013/000865
§ 371 (c)(1),
(2) Date: Feb. 9, 2015

(87) PCT Pub. No.: WO2014/022882
PCT Pub. Date: Feb. 13, 2014

(65) Prior Publication Data
US 2015/0225811 A1 Aug. 13, 2015

(30) Foreign Application Priority Data
Aug. 7, 2012 (AU) .................................. 2012903394

(51) Int. Cl.
C22B 19/34 (2006.01)
C22B 7/04 (2006.01)
(Continued)

(52) U.S. Cl.
CPC ............ *C22B 19/34* (2013.01); *B01D 53/507* (2013.01); *B01D 53/508* (2013.01); *B01D 53/80* (2013.01); *C22B 7/007* (2013.01); *C22B 7/04* (2013.01); *C22B 19/22* (2013.01); *C22B 19/30* (2013.01); *B01D 2257/302* (2013.01); *Y02P 10/234* (2015.11)

(58) Field of Classification Search
None
See application file for complete search history.

(56) References Cited

U.S. PATENT DOCUMENTS 5,585,079 A 12/1996 Fugleberg
6,726,889 B2 4/2004 Choi et al.

FOREIGN PATENT DOCUMENTS

| AU | 199728617 B2 | 1/1998 |
|---|---|---|
| CN | 1449861 A | 10/2003 |
| WO | WO 2012/103571 A1 | 8/2012 |

OTHER PUBLICATIONS

Written Opinion and International Search Report, PCT/AU2013/000865, dated Oct. 4, 2013.

*Primary Examiner* — Melissa S Swain
(74) *Attorney, Agent, or Firm* — Winston & Strawn LLP (57) ABSTRACT

A method for recovering zinc from slag derived from lead smelting comprises subjecting the slag to a leaching step under conditions in which zinc is dissolved into solution and silica present in the slag dissolves and re-precipitates in a form that is readily separable from liquid, and recovering zinc from the solution. The slag may be subjected to leaching in at least two stages in which in a first leaching stage only part of the zinc is removed from the slag and further zinc leaching from the slag occurs in a second stage to form a pregnant leaching solution and recovering zinc from the solution. The method may be used to remove $SO_2$ from a gas stream by using the $SO_2$-containing gas stream to leach a slurry of the slag.

20 Claims, 3 Drawing Sheets

(51) Int. Cl.
*C22B 3/00* (2006.01)
*B01D 53/50* (2006.01)
*B01D 53/80* (2006.01)
*C22B 7/00* (2006.01)
*C22B 19/30* (2006.01)

RECOVERY OF ZINC FROM LEAD SLAG

This application is a 371 filing of International Patent Application PCT/AU2013/000865 filed Aug. 6, 2013, which claims the priority of Australian application no. 2012903394 filed Aug. 7, 2012.

FIELD OF THE INVENTION

The present invention relates to a process for the recovery of zinc from lead slag. The present invention also relates to a method for reducing a sulphur dioxide content of a gas stream, such as a flue gas.

BACKGROUND TO THE INVENTION

Lead and zinc are invariably found together in nature. For example, the ore body located at Mount Isa, Queensland, Australia includes ore that contains both lead and zinc.

The lead/zinc ore at Mount Isa is mined and formed into two concentrates, a lead and a zinc concentrate. Separation between lead and zinc is not perfect, so some zinc reports to the lead concentrate and vice versa. The lead concentrate is sent to a lead smelter. The lead smelter converts the concentrate into lead metal and slag. The slag contains various fluxing agents used in the lead smelting operations and a significant quantity of zinc. The zinc content of the slag may vary between 10 to 15% by weight. The slag at Mount Isa has an average zinc content of around 12% by weight. The slag also contains significant quantities of iron, silica and calcium oxide. For example, the slag may comprise around 23% by weight iron, around 21% by weight silica and around 23% by weight calcium oxide.

As the slag derived from the lead smelting operations contains significant quantities of zinc, it represents a potentially valuable resource from which zinc can be recovered. Significant efforts have been expended over the previous 40 years to try to develop a process to recover the zinc from the slag derived from the lead smelting process. The most commonly used is the slag fuming, producing a zinc oxide that requires further treatment to remove deleterious impurities.

One problem encountered in previous efforts to recover zinc by hydrometallurgy from the lead smelter slag arises due to the presence of large amounts of silica (typically in excess of 20% by weight) in the slag. If the slag is subjected to a leaching step to leach the zinc from the slag using sulphuric acid as the leaching agent, silica is also dissolved in the leaching step. However, the dissolved silica then tends to form insoluble compounds that are in the form a gel which is extremely difficult, if not impossible, to separate from the liquor.

Another problem relates to the recovery of zinc from solution into a saleable form. The industry accepted way to achieve this is by removing all contaminants from solution by solvent extraction or purification and electrowinning to produce a relatively pure zinc product. This method to recover zinc is not possible in some regions, such as Mount Isa in Queensland as there is no access to sufficient electricity generating capacity for electrowinning. As a result, processes to precipitate the zinc as an oxide concentrate have been adopted in some instances. For example, the process described in U.S. Pat. No. 6,726,889 (the entire contents of which are herein incorporated by cross reference) has been trialled successfully to recover a high grade zinc oxide concentrate. In U.S. Pat. No. 6,726,889 a process is described where zinc sulphate solution is contacted with hydrated lime at pH 8.5-10.0 at a minimum 75° C. to produce a zinc oxide and gypsum. The two products can be separated gravimetrically and separation is improved by growing the gypsum through seed recycle. When a split size of 30 µm is achieved, a high quality zinc oxide concentrate results. Excellent zinc recoveries and concentrate grades have been obtained in pilot testwork using this method. For example, zinc grades of over 65% and recoveries of over 90% have been achieved. However, magnesium that is leached from slag and carried through in solution with zinc reports to the concentrate under the described operating conditions. The resulting magnesium concentration, between 3-4%, is such that the concentrate attracts significant penalties when sold to a zinc refinery. As a result, the process described by U.S. Pat. No. 6,726,889 is not suitable to produce a saleable concentrate from slag leaching solution. The magnesium concentration is such that the zinc oxide concentrate can only be sold with significant financial penalties, making the overall process unfavourable.

Many lead smelters that use lead sulphide concentrates as a feed material also generate significant quantities of sulphur dioxide. The sulphur dioxide leaves the lead smelter in the flue gas. Many other processes also result in the formation of flue gases or exhaust gases that contain $SO_2$. Consequently, the flue gas or exhaust gas will often require treatment to reduce the sulphur dioxide content before venting the flue gas to the atmosphere. In a sinter plant/blast furnace lead smelter arrangement, high volumes of flue gas with low $SO_2$ concentrations are generated. Typical $SO_2$ removal processes involve connection of the smelter to a sulphuric acid plant or gas scrubbing processes. High efficiency of $SO_2$ capture from a sinter plant with a sulphuric acid plant is difficult and expensive due to the low concentration of $SO_2$ and the high gas volume, particularly to meet modern emissions targets. Tail gases or low strength gas streams may be treated with a scrubbing process. For example, the flue gas may be scrubbed with lime or limestone to remove $SO_2$. This, of course, requires that lime or limestone be supplied, which increases operating costs.

The applicant does not concede that the prior arts discussed in this process forms part of the common general knowledge in Australia or elsewhere.

Throughout this specification, the term "comprising" or its grammatical equivalents are to be taken to have an inclusive meaning unless the context of use indicates otherwise.

BRIEF DESCRIPTION OF THE INVENTION

In a first aspect, the present invention provides a method for recovering zinc from slag derived from lead smelting comprising subjecting the slag to a leaching step under conditions in which zinc is dissolved into solution and silica present in the slag dissolves and re-precipitates in a form that is readily separable from liquid and recovering zinc from the solution.

In another aspect, the present invention provides a method for recovering zinc from slag derived from lead smelting comprising subjecting the slag to leaching in at least two stages in which in a first leaching stage only part of the zinc is removed from the slag and further zinc leaching from the slag occurs in a second stage to form a pregnant leaching solution and recovering zinc from the solution. Alternatively, a single stage can be used but this depends on the extent of scrubbing required and the target zinc recovery from the slag.

In embodiments of this aspect, the leaching step may comprise a first stage and a second stage, although more than 2 leaching stages may also be used.

In some embodiments, the leach solution may be treated to precipitate Fe therefrom prior to the step of recovering the zinc from the leach solution.

In another aspect, the present invention provides a method for recovering zinc from slag derived from lead smelting comprising subjecting the slag to a leaching step under conditions in which zinc is dissolved into solution, silica being added to the leaching step at a specific silicon addition rate (as defined hereunder) of 10 g Si/L·hour or less, separating the solution from a solid residue and recovering zinc from the solution.

In a further aspect, the present invention provides a method for reducing an $SO_2$ content of a gas stream comprising the steps of contacting the gas stream with a slurry containing slag derived from a lead smelter to cause leaching of zinc from the slag and separating a gas stream of reduced $SO_2$ content from the slurry. Zinc may be recovered from the leach liquor.

In a further aspect, the present invention provides a method for recovering zinc from slag derived from lead smelting comprising the steps of contacting the gas stream with a slurry containing slag derived from a lead smelter to cause leaching of zinc from the slag and separating a gas stream of reduced $SO_2$ content from the slurry.

In some instances, it may be necessary to grind or mill the slag prior to supplying it to the method of the present invention. The grinding or milling will reduce the particle size of the slag and the grinding or milling step is suitably conducted so that the particle size of the slag is reduced to a desired particle size that provides good leachability and can be readily suspended in an agitated reactor. The upper limitation for grind size will typically be agitation power required to keep the solids suspended. The present inventors have found that grinding or milling of the slag so that the particle size is reduced such that $P_{80}$ is approximately from 30 to 300 µm, more preferably 30 to 150 µm, even more preferably about 65 µm, is suitable.

The slag is subjected to leaching in order to dissolve the zinc contained in the slag. In some embodiments, the slag is subjected to an acid leaching process. Inorganic acids are suitable acids for use in the leaching process, with sulphuric acid being preferred. Spent electrolyte from a zinc smelter can also be used, enriched with sulphuric acid. An alternative to sulphuric acid addition as the leaching agent is direct injection of dilute or concentrated streams of sulphur dioxide ($SO_2$) as the leaching agent. For example, an $SO_2$ stream could be contacted with slurry in the usual way in a conventional hydrometallurgical reactor or in a modified Flue Gas Desulphurisation (FGD) process. $SO_2$ will react with oxygen in the gas stream and $Fe^{++}$ ions to generate sulphuric acid and perform the same duty as if sulphuric acid had been added to the process. Advantageously, the gas stream also has its $SO_2$ content reduced.

In some embodiments of the present invention, the leaching process may comprise a single stage leaching process.

In other embodiments of the present invention, the leaching process may involve leaching to remove a part of the zinc contained in the slag followed by further leaching at a lower pH to remove further zinc from the slag. The leaching process in these embodiments may comprise a first stage leaching process and a second stage leaching process.

The leaching process initially involves contacting the slag with the leaching agent, such as an acid leaching agent. The slag may be fed to the leaching process in the form of a dry slag or it may be fed in the form of a slurry of slag. The slag may be mixed with water in order to produce the slurry of slag. If an $SO_2$ containing gas stream is used as the leaching agent, a slurry containing the slag is used.

In some embodiments of the present invention, the leaching process may be conducted in a first stage that removes part of the zinc from the slag and a second stage that removes further zinc. For convenience and brevity of description, the present invention will hereinafter be described with reference to a first stage leaching process and a second stage leaching process. However, it will be understood that this is intended to encompass both two different leaching stages conducted in different process vessels, as well as a leaching process conducted in a single vessel under initial conditions followed by a change in leaching conditions to leach further zinc from the slag. Thus, the "first stage" and the "second stage" of the leaching process should be understood in this context.

The first stage of the leaching process involves adding a leaching agent, such as an acid or $SO_2$, in an amount that provides only a portion of the overall acid demand. Throughout this specification, the term "acid demand" will be understood to mean the amount of acid required to extract approximately 95% of the zinc contained in the slag. In some embodiments, the acid is added in an amount such that from 40% to 70% of the zinc is extracted from the slag in the first stage of the leaching process, more preferably from 50% to 65% of the zinc is extracted from the slag in the first stage of the leaching process, even more preferably around 60% of the zinc is extracted from the slag in the first stage of the leaching process.

The pH in the first stage of the leaching step is suitably controlled such that the pH falls in the range of from 2.0 to 5.0, more preferably from about 3.0 to about 4.0.

The reactions that take place in the first stage of the leaching step are very exothermic. Thus, it may be necessary to provide some cooling in the first stage of the leaching process. As the first stage of the leaching process involves exothermic reactions, it is possible to control the temperature in the first stage of the leaching process by controlling the amount of cooling provided to the first stage of the leaching process.

In some embodiments, the first stage of the leaching process is operated at a temperature that is below the boiling point of the liquor. Suitably, the first stage of the leaching process may be operated at temperatures falling within the range of 50° C. to 100° C., preferably 70° C. to 95° C., more preferably about 90° C.

The residence time in the first stage of the leaching process is suitably at least 4 hours, more suitably at least 6 hours. The residence time in the first stage may be longer than 4 to 6 hours, but there are little, if any, benefits in terms of zinc recovery arising from a longer residence time and throughput of the process will be compromised by using a longer residence time. The residence time may be adjusted to satisfy the maximum silicon addition rate or should excessive heat generation become an issue.

The slurry from the first stage of the leaching process is subsequently sent to the second stage of the leaching process. In the second stage of the leaching process, the solids are further leached with further leaching agent, such as further acid. Therefore, further acid is added to the slurry from the first stage of the leaching process. Suitably, an excess of acid (beyond the acid demand of the solids) is used. The pH in the second stage of the leaching process is suitably less than 2, such as from 0.5 to 2.0, more suitably from 0.5 to 1.5, more suitably around 1.0 which is equivalent to 15 g/L free sulphuric acid.

The residence time in the second stage of the leaching process is suitably at least 4 hours, more suitably at least 6 hours. The residence time in the second stage may be longer than 4 to 6 hours, but there are little, if any, benefits in terms of zinc recovery arising from a longer residence time and throughput of the process will be compromised by using a longer residence time. The residence time may be adjusted to satisfy the maximum silicon addition rate or should excessive heat generation become an issue. Oxygen may be introduced at this step to oxidise $Fe^{++}$ to $Fe^{+++}$ allowing the precipitation of some of the iron as jarosite as an alternative.

The temperature in the second stage of the leaching process may be similar to the temperature used in the first stage of the leaching process. Again, as the reactions taking place in the second stage of the leaching process are exothermic, controlled temperature is easily achieved by controlling the amount of cooling provided to the second stage of the leaching process.

Without wishing to be bound by theory, the present inventors believe that adding the acid in two steps or stages above the minimum residence times (as described above) in order to extract the zinc from the slag avoids or minimises the formation of silica compounds that are difficult to remove from solution or render processing of the solution difficult.

Without wishing to be bound by theory, the present inventor has postulated that almost all silicon bonded with zinc in the slag will be dissolved when contacted with acid. After dissolution, silicon becomes saturated in solution and reprecipitates. When the rates of silicon dissolution and reprecipitation, or the silicon kinetic behaviour, are in equilibrium, silicon will precipitate in a form that will readily allow solid/liquid separation. Silicon kinetic behaviour will remain under control if the conditions of acid addition and residence time are met. If not, silicon will precipitate as an amorphous gel which will result, at minimum, in downstream solid/liquid separation problems, lower zinc recovery and increased slurry viscosity and at worst complete reactor seizure and production stoppages.

The requirement of minimum residence time may change with a different slag composition. For example, where a certain slag has a silica content that is lower than Mount Isa slag, a lower process residence time may be permitted. This limitation can be expressed as the specific silicon addition rate. The specific silicon addition rate is defined by the mass flow rate of silicon entering the reactor expressed as tonnes per hour divided by the live volume of the leaching stage expressed as cubic meters. The result is the specific silicon addition rate expressed as $t/m^3 \cdot h$ or simplified to $g/L \cdot h$.

With Mount Isa slag, 2 hours residence time per leach stage or total 4 hours residence time in the leach stage results in a specific silicon addition rate of 10 g Si/h per L reactor volume ($g\, Si/L \cdot h$). At 4 hours residence time per stage or 8 hours total the rate is 5 g $Si/L \cdot h$. At 6 hours residence time per stage or 12 hours total the rate is 3.3 g $Si/L \cdot h$. To minimise process risk the specific silicon addition rate should not exceed 3.3-10, more preferably 3.3-5 g $Si/L \cdot h$ when considering both leaching stages.

In some embodiments of the invention, the specific silicon addition rate, as calculated across both leaching stages, is 5 g $Si/L \cdot h$. or less, more desirably 3.3 g·$Si/L \cdot h$. or less. The specific silicon addition rate is controlled by a combination of the amount of silica present in the slag being leached and the residence time in the leaching stages To minimise equipment size, the process is desirably run at maximum dissolved zinc concentration. This means the process is run with as high as practicable solids content in the leach and presents the upper limitation to solution zinc tenor. The leach can be run at 30-55% solids, or more preferably 40-55% solids or even more preferably 45% solids. The upper limitations on the process solids content are the usual ones for a hydrometallurgical process, namely agitation and materials handling.

The first stage and the second stage of the leaching process may be conducted in separate of vessels. Alternatively, the first stage of the leaching process and the second stage of the leaching process may be conducted in the same vessel provided the described process conditions are met.

The leaching process may be conducted in any suitable process vessel. For example, the leaching process may be conducted in a continuously stirred tank reactor. The process vessel may be an open process vessel or it may be a closed process vessel. As temperatures above the boiling point of the liquor are not typically used in the leaching process, it is not necessary to conduct the leaching process under pressure. Where $SO_2$ is contacted with the slag instead of sulphuric acid, vessel design may be required to permit capture of the reactor vent gases for recycle to the leach given that all $SO_2$ will not be absorbed to the leach on first pass. Alternatively, in embodiments where a gas stream containing $SO_2$ is used to leach zinc from the slag, conventional gas/liquid contacting equipment may be employed to utilise the $SO_2$ in the gas stream. This will in turn scrub the $SO_2$ from the gas stream.

In situations where a zinc smelter is close by, it may be advantageous to use spent electrolyte from the zinc smelter as a leaching solution. The spent electrolyte may be enriched with sulphuric acid, if desired or required. The leach liquor obtained from the process of the present invention may then be sent to the main stream of the leaching circuit of the zinc smelter. This will allow for use of minimum water in the process. The leach liquor may be sent to the main stream of the leaching circuit of the zinc smelter following Fe precipitation, or Fe precipitation may take place in the main stream of the leaching circuit of the zinc smelter.

In embodiments where the leaching step results in the presence of dissolved iron in solution, the leach solution leaving the leaching process may be subjected to a treatment step in order to precipitate dissolved iron from the liquor. In some embodiments, the slurry (i.e. both the solids and the liquor) from the leaching process is subjected to the treatment step so that the precipitated iron compounds precipitate on to the solids in the slurry. In other embodiments, the liquor from the leaching process may be separated from the solids residue of the leaching process and the liquor subsequently treated to precipitate iron.

Dissolved iron in the leach liquor may be precipitated using any suitable process known to the person skilled in the art. For example, iron may be precipitated using a standard jarosite precipitation in which oxygen is added. The pH may be raised by adding a neutralising agent, such as aqueous ammonia, calcine from roasted zinc concentrates, recycle streams from other paths of the process, lime or even the slag derived from a lead blast furnace.

The treatment step to precipitate dissolved iron will typically result in the precipitation of from 50 to 95% of the dissolved Fe, more typically around 90% of the dissolved Fe. Typically 40 to 75% of the dissolved aluminium will be precipitated, more typically around 65% of the dissolved aluminium. If oxygen is introduced into the leaching stage, the amount of Fe precipitated in this step will be lower as there will have been an initial precipitation of Fe in the leaching stage.

After Fe precipitation, zinc may be recovered from the liquor using any known process.

The precipitated iron and other solids (such as the solids residue) may be separated from the liquor. This may be achieved using any suitable solid/liquid separation process. Examples include filtration, clarification, thickening, use of hydrocyclones, or the like. A flocculating agent may be added prior to the solid/liquid separation step. The flocculating agent may be an anionic flocculating agent, although other flocculating agents may also be used. The present inventors have found that by conducting the leaching process as described above, the silica that dissolves in the leaching process tends to immediately reprecipitate onto the solids in the leaching process. The reprecipitated silica compounds (which have not been characterised by the present inventors) do not adversely affect the solids/liquid separation process. In particular, the formation of a gel material does not occur. Thus, the solids/liquid separation process can be conducted with satisfactory efficiency and throughput. The solids residue obtained from the solids/liquid separation process may be used as mine fill or landfill after appropriate treatment.

Following solids/liquid separation, a leach liquor containing dissolved zinc is obtained. This leach liquor is subsequently treated to recover zinc therefrom or incorporated into the leaching stream of a zinc smelter. In this latter case, spent electrolyte reinforced with sulphuric acid may be used as a leaching liquor with preference to water and sulphuric acid.

It will be appreciated that the leach liquor recovered from the solid/liquid separation step may still contain some dissolved Fe (such as around 1 g/L). Thus, the leach liquor may be treated to separate further Fe therefrom and then treated to recover zinc. Any suitable treatment known to the person skilled in the art to remove further Fe may be used. For example, the treatment of the leach liquor to separate further Fe therefrom may comprise adding oxygen or air to the leach liquor and a neutralising agent raising the pH to 4.0-4.5 to cause further precipitation of Fe. Various neutralising agents would be suitable such as aqueous ammonia, calcine from roasted zinc concentrates, lime, recycle streams from other parts of the process or even the slag derived from a lead blast furnace. Desirably, this step will also minimise the carry over of dissolved aluminium to the zinc recovery steps. The precipitated solids arising from this treatment are separated from the liquor that contains dissolved zinc, for example by thickening, clarification, filtration or any other suitable solid/liquid separation process. The liquor may then be treated to recover zinc therefrom. The solids arising from this step may be recycled to the leaching process.

In embodiments where $SO_2$ is used as the leaching agent, slag can be leached with $SO_2$ in a variety of leaching vessels. This ranges from conventional agitated tank leaching vessels to modified flue gas desulphurising systems. In the case of modified flue gas desulphurising vessels, a milled slag slurry is fed to scrub $SO_2$ from the incoming gas stream in place of lime or limestone. In turn, zinc is leached from the slag into solution which can be separated from the solid residue allowing the zinc to be recovered from solution in the same way that is proposed for direct slag leaching. Contact between the gas stream and the slurry may take place in a single vessel or in two or more vessels. Factors that may be taken into consideration in the design of the contacting systems include how much $SO_2$ is present in the inlet gas stream and how much should be removed.

In some embodiments, the slag is milled to around 65 μm and pumped around a ring main that services the gas scrubbing system. Gas is continuously fed into the scrubbing system and is contacted with a recirculating load of slurry to scrub out the $SO_2$. The $SO_2$ dissolves in the water phase and reacts with iron, oxygen and water present in solution to form sulphuric acid. The sulphuric acid in turn reacts with the slag to form metal sulphates which is a major mechanism for zinc leaching. As $SO_2$ is absorbed into the scrubbing liquor the pH drops and the capacity for scrubbing decreases. As such, ground slag slurry is dosed into the scrubbing system from the ring main to regulate the pH and allows continuous scrubbing of the entering gas stream. Gas and slurry fall into the mixing area of the reactor where cleaned gas separates away from the slurry and can be vented to the atmosphere. Air is injected into the slurry in the mixing area to ensure that oxygen is present in the scrubbing liquor to participate in scrubbing reactions and also to convert any residual sulphites to sulphates.

Slurry accumulates in the mixing section of the scrubbing vessel and although most is recycled back to contact with the incoming gas containing $SO_2$, some of the slurry is periodically purged to maintain slurry level and slurry density. The purged slurry contains reacted solids and zinc sulphate in solution.

The scrubbing vessel can be operated in ranges of pH 1.0 to 5.0 and the scrubbing efficiency for a set piece of equipment will decrease as pH decreases. For a set sized piece of equipment operating at a constant liquid to gas ratio, scrubbing efficiency in a single pass will range from 50% at pH 1.0 to 98% at pH 5.0. The slag consumption per unit of $SO_2$ scrubbed increases as pH increases. The zinc recovery from a unit of slag will decrease as pH increases. When combining the effects of zinc recovery and, slag consumption on operating pH, the net amount of zinc recovered per unit of $SO_2$ scrubbed is relatively constant no matter what the pH operating point is. However, for a set piece of equipment the scrubbing efficiency will increase with increasing operating pH and this results in an overall increase in metal production.

The scrubbing vessel will operate at steady state conditions without the need of external heating or cooling.

The scrubbing vessel can be operated in series with other scrubbing vessels to increase the overall scrubbing performance and also operate at different pH set points to optimise the properties of slag consumption, scrubbing efficiency and zinc extraction. The scrubbing vessel can also remove dust from the gas stream as well as soluble metals such as thallium and cadmium for recovery.

The resulting slurry from the scrubbing system can then be subjected to the same processes as described for direct acid leaching, namely, solid/liquid separation, iron and aluminium precipitation and zinc recovery. However, in the slag scrubbing system where the pH operating point is above that for iron and aluminium precipitation (i.e. above pH 3.0), an external stage for iron and aluminium removal is not required and iron and aluminium removal occurs in situ of the scrubbing system. Additionally, if the pH is above 4.0 in the scrubbing step, iron and aluminium polishing is not required and can be precipitated in situ in the scrubbing system.

Experiments have shown that scrubbing $SO_2$ from gas with slag will work across the same range of operation as that experienced with limestone, which is typically 0.01% $SO_2$ to 25% $SO_2$, but would be as high as 50% $SO_2$.

The benefit of in situ iron and aluminium precipitation can be obtained by operating two scrubbing vessels in series, with one vessel operating at pH 2.0 and one operating at pH 4.0, for example.

The leach liquor arising from the further Fe separation stage or from the $SO_2$ scrubbing system operated at a sufficiently high pH contains very low levels of dissolved Fe (such as around 10 ppm). This liquor may be treated to recover zinc by any known method. The preferred method where the leaching plant is not located near sufficient electricity generating capacity to recover metal by electrowinning is to produce a solid zinc compound intermediate. Two product options are possible, these being, zinc oxide and zinc carbonate.

The zinc oxide process involves a precipitation step that is operated in a range where zinc will be precipitated and magnesium will remain in solution. The key operating conditions are pH from 5.5-6.5 but preferably about 6.5 and an operating temperature of from 70 to 95° C., preferably about 90° C. All other aspects of the process are the same as described in U.S. Pat. No. 6,276,889, such as residence time, the requirement for seeding of gypsum crystals and separation of zinc oxide and gypsum by gravity. The gypsum fraction from the gravity separation is recycled to the process. The zinc oxide fraction is thickened and filtered where the filtrate is bled or recycled to ensure control of dissolved magnesium is solution.

The zinc carbonate process is a variant again of U.S. Pat. No. 6,726,889 where the process is operated at conditions where zinc is precipitated and magnesium is not. There are many differences between hydrated lime and limestone. The obvious one is the chemical composition but the important one in this application is the reactivity. Limestone is capable of precipitating zinc from solution, but it isn't as reactive as hydrated lime and therefore significantly more limestone is required to precipitate the zinc, for example up to 50%, than the stoichiometric requirement due to unreacted limestone. One possible mechanism that causes this arises where the limestone particle becomes coated in a gypsum layer and remains inert. The other avenue for unreactive limestone is that the driving force for complete reaction is not as high with limestone compared to hydrated lime. Generally speaking, the case where gypsum coats the particle can be overcome by regrinding the material to liberate the limestone surfaces but this is not amenable to the process as grinding will break down the gypsum particles potentially rendering them less than 30 μm and reporting to the concentrate but likely interfering with the seeding/gypsum growth cycle. The driving force issue that limits limestone reactivity can be overcome by re-treating the solids with fresh feed.

In one embodiment, milled limestone is contacted with zinc sulphate solution at pH 5.0-6.0 but more preferably pH about 5.5 at a temperature of from 70 to 95° C., preferably about 90° C. The milled limestone may have a nominal size of less than 100 μm, such as about 75 μm. Zinc carbonate and gypsum will precipitate. The slurry is then passed to a separator to separate the zinc carbonate and gypsum from the solution. For example, the separator may be a thickener where the overflow is sent forward to zinc polishing (as not all zinc may be removed from solution) or for solid/liquid separation. The underflow from the first thickener may be recycled to another reactor or directly to the thickener preferably at about 90° C. to contact all or just a portion of the incoming fresh zinc sulphate stream from the leach process. In this stage, any unreacted limestone from zinc precipitation is converted to gypsum. Minimal zinc would be precipitated from solution at this stage as reaction of unreacted limestone would dominate. The slurry from this stage is sent to a second separator and the liquid stream, which still contains dissolved zinc, is sent for zinc precipitation with limestone. The underflow from the second separator may be sent to zinc solution polishing to remove any zinc from solution or may be sent straight to gravity separation where the zinc carbonate would report to the fine fraction and the coarse gypsum fraction would be recycled to the process. The concentrate could then be passed to a further separator, such as a thickener and filter. The cake may be washed to remove any magnesium in solution and also remove any zinc should a zinc polishing step be excluded. The zinc polishing step may be conducted by any known method and could be a continuously stirred tank reactor (CSTR) contacting the slurry and hydrated lime at suitable conditions, such as pH 6.5, to precipitate any zinc from solution.

In order to further understand the present invention, a preferred embodiment will be described with reference to the accompanying drawings.

BRIEF DESCRIPTION OF THE DRAWINGS

FIG. 2 shows a flow sheet of an embodiment of the process of the present invention where slag is leached directly with sulphuric acid. FIG. 2 uses a different zinc recovery process to that of FIG. 1.

DETAILED DESCRIPTION OF THE DRAWINGS

It will be appreciated that the attached drawing has been provided for the purposes of describing a preferred embodiment of the present invention. Thus, it will be understood that the present invention should not be considered to be limited to the features as shown in the attached drawings.

Direct Sulphuric Acid Leaching of Slag

Figure 1:
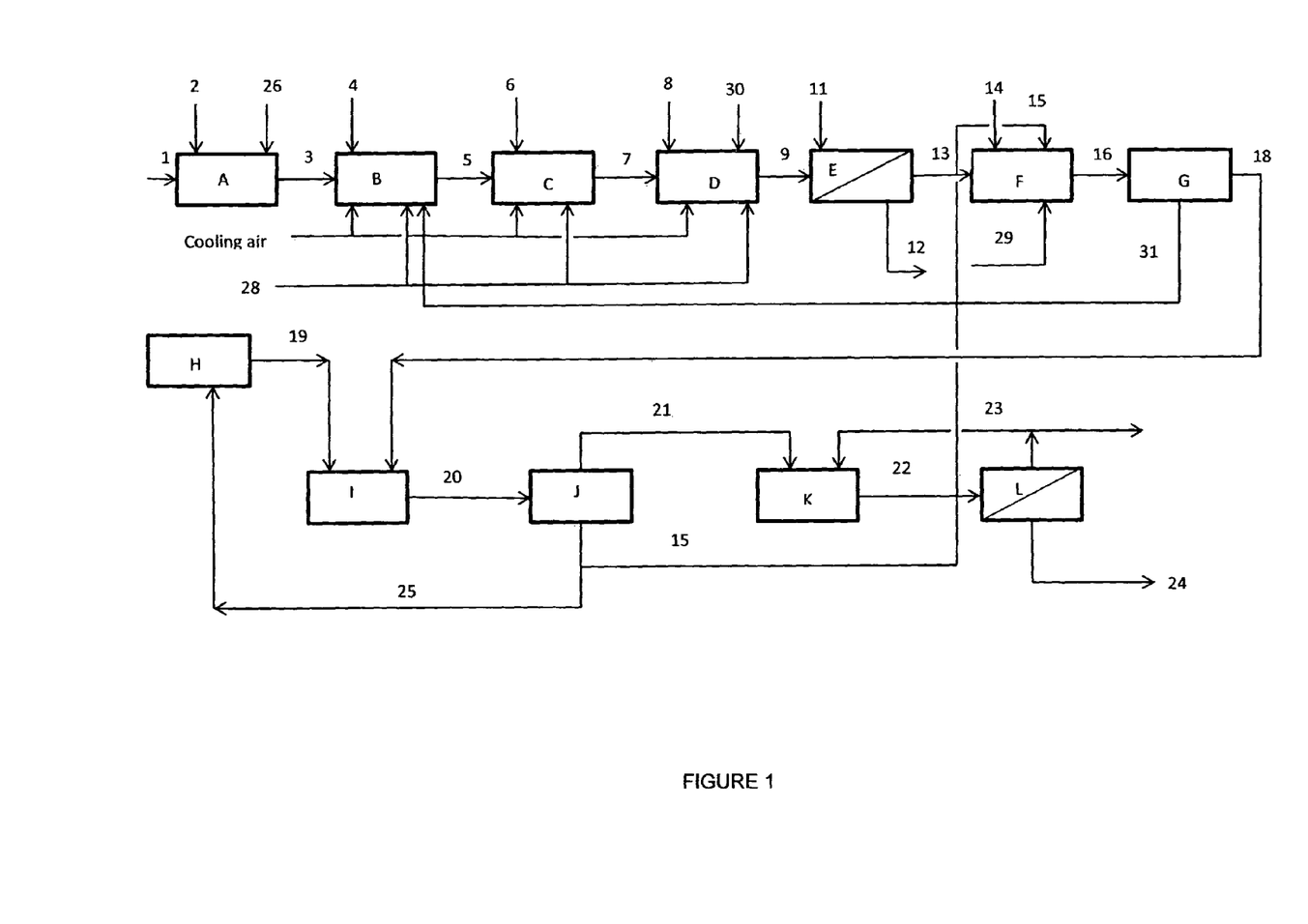
FIG. 1 shows a flow sheet of an embodiment of the process of the present invention where slag is leached directly with sulphuric acid

In FIG. 1, a grinding circuit A is supplied with water 1, and slag resulting from lead smelting operations. This slag is supplied directly from the lead smelter via stream 2 and/or from a stockpile of slag via stream 26.

A typical analysis of the slag being fed to the mill is as follows:

| | |
|---|---|
| Zn | 11-16% |
| Pb | 2.0-2.5% |
| Fe | 20.5-25.0% |
| Ca | 16.0-18.0% |
| Mg | 0.4-1.2% |
| Al | 0.6-1.0% |
| Si | 8.5-10.5% |
| Cu | 0.1-0.4% |

Throughout this specification, all percentages are given in terms of weight percent.

The slag that is fed to the grinding circuit A has a particle size distribution such that the $P_{80}$ of the slag is approximately 1300 μm. The mill grinds or crushes the slag such that the slag leaving the circuit has a particle size distribution such that the $P_{80}$ is approximately 65 μm.

After leaving the grinding circuit A, the slurry of water and ground slag 3 is sent to the leaching process. The leaching process is conducted in two steps or two stages, namely B and C. The leaching stage may be conducted in two separate process vessels, with the first step or stage being conducted in one process vessel or vessels and the second step or stage being conducted in another process vessel or vessels. Alternatively, the leaching process B and C may take place in a single reactor, with the conditions of the leaching and residence time being changed as the process progresses from the first step or stage to the second step or stage.

One possible embodiment is shown with leach stages B and C in which the leaching process is conducted in two separate process vessels. The slurry 3 from grinding circuit A is fed to the first leaching vessel B. Acid 4 is added to the first vessel B. The acid 4 may comprise sulphuric acid or an $SO_2$ stream. Air may be added to both stages of leaching B and C for evaporative cooling. Oxygen may also be added to leach stage C for dissolved iron control resulting in jarosite precipitation.

The slurry 5 from process vessel B (which contains solids and liquids) is transferred to the second process vessel C in which the second stage of the leaching process is conducted. In particular, in the second stage, further sulphuric acid 6 is added to the process vessel to cause further dissolution of zinc from the solids. The slurry 7 from the second process vessel C (and therefore from the second stage of the leaching process) is then removed from the second process vessel.

The first stage of the leaching process is operated at a pH that falls between 3.0 and 4.0. In the first stage of the leaching process, about half of the acid required to meet the acid demand of the slag is added. This results in leaching of approximately 60% of the zinc contained in the slag. The acid also dissolves some of the iron in the slag and, in the first stage, around 40% extraction of iron occurs. Furthermore, some of the magnesium, aluminium and manganese in the slag also dissolves in the first stage of the leaching process. $Fe^{3+}$ species dissolved in the first stage also precipitate in the first stage. $Fe^{2+}$ and $Zn^{2+}$ also dissolve in the first stage and remain soluble. The solute in the first stage may have a dissolved zinc content of approximately 35 g per liter and a dissolved iron content of approximately 25 g per liter.

The reactions that occur in the first stage of the leaching process are highly exothermic. Therefore, it will generally be necessary to cool the first stage in order to control the temperature of the first stage. The present inventors operate the first stage of the leaching process at 90° C., although other range of temperatures may also be used.

The residence time in the first stage of the leaching process is desirably at least 4 hours, but preferably 6 hours.

The slurry from the first stage of the leaching process is then treated in the second stage of the leaching process. In the second stage of the leaching process, an excess of acid is used, in that more acid than is required to meet the acid demand of the slag is added. Typically, an excess of 10 to 15 g per liter of acid is used. The pH in the second stage of the leaching process is typically around 0.5 to 1.5, more desirably from 0.5 to 1.0. The temperature and the residence time in the second stage of the leaching process are generally similar to that used in the first stage of the leaching process (i.e. 90° C. and a residence time of at least 6 hours).

For reasons of maximising throughput of the process, it is desirable to use a specific silicon addition rate that is compatible with process stability and robustness. It is believed that a specific silicon addition rate of up to 10 g Si/l·h, more suitably up to 5 g Si/l·h, will produce acceptable processing. However, a specific silicon addition rate of up to 3.3 g Si/l·h is believed to produce further enhancements to process stability and robustness while still retaining a process report that is significantly higher than the prior art led slag leaching processes known to the inventor. Process residence time and slag feed rate can be adjusted to achieve the acceptable range of silicon addition rate.

While a process residence times of 4 hours per leaching stage or 8 hours total are possible and do fall within the scope of the present invention, process residence times below 6 hours per leaching stage or 12 hours in total may cause unstable kinetic behaviour of silica which results in downstream problems such as solid/liquid separation or formation of silica gel. Operating below a total leaching residence time of 12 hours will reduce process robustness. In more preferred embodiments of the present invention, the specific silicon addition rate is from 3.3-5 g Si/L·h and is desirably kept below this value to ensure acceptable process conditions. In both stages of leaching, air 27 may be introduced for temperature control.

Sufficient copper, present mainly as a sulphide, will also be leached from the slag to act as a catalyst for the oxidation of iron species.

The discharge slurry 7 from the leaching stages may have the following composition:

Solids:

| | |
|---|---|
| Zn | 0.2-0.4% |
| Pb | 1.0-2.0% |
| Fe | 5.0-8.0% |
| Ca | 12.0-16.0% |
| Mg | 0.1-0.2% |
| Al | 0.1-0.3% |
| Si | 6.0-9.0% |

Liquid:

| | |
|---|---|
| Zn | 50-60 g per litre |
| $Fe^{2+}$ | 5-40 g per litre |
| $Fe^{3+}$ | zero |
| Ca | 0.15-0.5 g per litre |
| Mg | 1.2-2.5 g per litre |
| Al | 2.0-5.0 g per litre |
| Mn | 0.2-0.7 g per litre |
| Cu | 0.1-0.5 g per litre |
| Si | 0.1-0.3 g per litre |
| $H_2SO_4$ | 10-20 g per litre |
| pH | 0.5-1.0 |

The slurry 7 from slag leaching is subsequently fed to the treatment step D in which precipitation of dissolved Fe and Al takes place. In the process flow sheets shown in FIG. 1, the treatment step D involves a jarosite precipitation. In this process, air or oxygen 28 and lead blast furnace slag 8 is fed to the process vessel. Sodium sulphate 30 is also fed to the process vessel. The source of sodium may also be fed to leach reactor C, if required. The sodium sulphate provides a source of sodium for the precipitation of jarosite. Other sodium or ammonia sources may also be used. Addition of the blast furnace slag 8 acts to neutralise some of the acid and increases then maintains the pH to around 1.0- 2.0, which corresponds to about 5 g/L free sulphuric acid. In some embodiments, oxygen may also be introduced to leaching vessel 2 (C) to precipitate some jarosite as well. This results in the formation of jarosite having a chemical formula of $NaFe_3(SO_4)_2(OH)_6$. The reaction that forms jarosite also generates acid. The slag will neutralise acid coming from the leaching stage and also neutralise the acid generated during iron precipitation. Adding oxygen to the leaching stage may be desirable to precipitate some of the jarosite in the leaching stage because the acid generated from the precipitation reaction reduces the acid demand of the slag. It will be understood that the sodium component in this formula may be replaced by other cations, as will be well known to person is skilled in the art. The jarosite is formed as a precipitate and the jarosite precipitates on the solids in the slurry in process D.

The jarosite precipitation process D results in the precipitation of substantial amounts of the $Fe^{2+}$ in solution after oxidation to $Fe^{3+}$. However, complete precipitation of the $Fe^{2+}$ is unlikely to occur in step D. Indeed, modelling conducted by the present applicant has shown that the amount of $Fe^{2+}$ remaining in the liquid following the jarosite precipitation may be up to 3 to 4 g per liter but more likely 1-2 g/L.

It will be understood that the jarosite precipitation step D may be conducted in one or more separate stages.

Jarosite stages may require heat addition via steam injection as excessive heat loss can occur when gases are injected for iron oxidation.

The slurry 9 from the jarosite precipitation process D is subsequently sent to solid/liquid separation step E. A flocculating agent may be added prior to solid/liquid separation. In the flow sheets shown in FIG. 1, solid/liquid separation step E utilises a filter to separate the solids from the liquid. A flocculating agent 10 may be added to assist in the filtration step. Wash water 11 is also used to wash the filter cake. Approximately 1-1.5 tonne of wash water is required for every tonne of solid to ensure 99% solution recovery.

The solid residue 12 from filter step E is recovered and used as mine fill. It has been found that the solid residue 12 has good qualities that enable it to be used as a mine fill. Indeed, the solids residue 12 has structural properties that are equivalent to about half those of cement. Therefore, it is believed that the solids residue has the potential to provide a replacement for approximately one third of the cement presently used for mine fill operations.

Advantageously in the process of the present invention, the leaching step utilised in the process results in the formation of precipitated silica compounds that have desirable filtering qualities and therefore do not deleteriously affect the filtering operation. This is in sharp contrast to previous attempts to recover zinc from lead smelting slag in which silica containing gels or colloidal silica containing particles were formed in a precipitation step and which proved to be very difficult to separate from the liquor.

The liquid separated from the solids in filter step E is transferred via stream 13 to downstream processing for polishing of iron and aluminium. The liquid stream 13 may have the following dissolved components:

| | |
|---|---|
| Zn | 34-38 g per litre |
| $Fe^{2+}$ | 0.5-1.0 g per litre |
| $Fe^{3+}$ | 0.01 g per litre |
| Ca | 0.2-0.4 g per litre |
| Mg | 1.0-2.0 g per litre |
| Al | 0.5-1.0 g per litre |
| Mn | 0.1-0.5 g per litre |
| Cu | 0.1-0.5 g per litre |
| Si | 0.05-0.2 g per litre |
| pH | 1.0-3.0 |

The liquor 13, as mentioned above, is subsequently treated to polish remaining iron and aluminium. In the flow sheets shown in FIG. 1, the subsequent treatment of the liquor 13 may be summarised as including a further Fe precipitation step, followed by zinc oxide precipitation and separation.

The, further Fe precipitation step may be described as a polishing step. In the further Fe precipitation step F, the liquid 13 is mixed with slag, lime or any other neutralising agent 14 and recycle material from zinc precipitation 15 and air or oxygen 29. As the liquid also contains some sodium sulphate, further precipitation of jarosite occurs to reduce the content of dissolved Fe in the liquid to significantly less than the 1 g per liter. In this step, iron is more likely precipitated as goethite or some other iron hydroxide rather than jarosite—sodium is just carried through. The pH of the liquid following the further Fe precipitation step F is approximately 4.5.

The slurry 16 from solution polishing F is sent to clarifier G. In clarifier G, the precipitated solids are removed in the underflow 31 and the polished liquor or Pregnant Leach Solution (PLS) 18 is removed via the overflow. A flocculating agent 17 may be added to the clarifier G in order to assist in the solid/liquid separation process.

As shown in FIG. 1, the solids contained in the underflow 31 are recycled to the leach process B. These solids contain approximately 3% to 10% zinc and by returning solids 31 to the leaching process, further zinc may be extracted therefrom.

The PLS 18 from clarifier G may contain dissolved zinc in an amount of up to 40 g per liter, typically in the range of 30 to 40 g per liter. This liquid has minimal dissolved iron content (10 ppm) and minimal dissolved aluminium content (5 ppm).

This liquor is subsequently treated to recover zinc therefrom. Zinc may be recovered using any process known to be suitable to the person skilled in the art. There are two options provided in this instance. One is the zinc oxide precipitation method and the other is the zinc carbonate precipitation method. It will be appreciated that the present invention should not be considered to recovery of zinc using these two processes alone and that the present invention encompasses any other suitable processes known to recover zinc from solution.

FIG. 1 shows zinc recovery using zinc oxide precipitation. In FIG. 1, liquid 18 may be subsequently fed to zinc oxide precipitation I as described in U.S. Pat. No. 6,726,889, the entire contents of which are herein incorporated by cross reference. However it should be noted that different process conditions to those described in U.S. Pat. No. 6,726,889 are employed to prevent the precipitation of magnesium and magnesium reporting to the concentrate. The preferred process conditions are pH 6.5 at 70-90° C. In this step, lime 19 is added to the liquid. The lime may be hydrated lime ($Ca(OH)_2$) or lime (CaO). Steam may also be required for heating, but if CaO is added, the heat released by the exothermic hydration reaction to form Ca $(OH)_2$ may be sufficient to heat the solution to the desired temperature. Addition of the lime causes precipitation of zinc oxide. Gypsum will also be formed. Careful control of the precipitation parameters results in the zinc oxide forming with a crystal structure that allows for easy separation of the zinc oxide from the precipitated gypsum by virtue of differences in the size of the zinc oxide particles and the gypsum particles. This aspect of the zinc oxide precipitation process (to produce the zinc oxide precipitate with physical properties that allow for easy separation from gypsum) is well known to person is skilled in the art, but it is believed that the operating conditions to prevent precipitation of magnesium are unique.

The slurry 20 of liquid and precipitated solids from zinc oxide precipitation step I is sent to zinc oxide separator J, which suitably may be in the form of a cyclone. In this separator J, the solids are separated into a fine overflow stream (e.g. sub 30 µm) 21 (which contains approximately 70% zinc and approximately 2 percent calcium, equating to 95 to 99% recovery of the zinc oxide) and a coarse underflow stream (e.g. plus 30 µm stream) (which contains approximately 2% zinc and the bulk of the remainder being gypsum).

The zinc oxide stream 21 is sent to zinc oxide thickener K. A flocculating agent may be added. The thickened zinc oxide stream 22 obtained therefrom is sent to the zinc oxide filter L. Wash water is used to wash the filter cake to remove any soluble contaminants such as chlorine. The filtrate 23 is subsequently returned to the zinc oxide thickener K or a portion of the flow may be bled to control accumulation of deleterious minor elements. A zinc oxide containing filter cake 24 is then sent to stockpile. The zinc oxide filter cake may be sold as a concentrate suitable for recovery of zinc therefrom.

Returning now to the zinc oxide separator J, the underflow is split into recycle streams 15 and 25. Stream 15 is returned to the iron polishing stage F for recovery of contained zinc and neutralisation duty. Stream 25 is recycled to permit seeding of the gypsum crystal facilitating improved separation of zinc oxide and gypsum at the zinc oxide separator. If hydrated lime slurry is used, stream 25 is recycled to the hydrated lime stock tank. If CaO is used, stream 25 is recycled to the zinc oxide precipitator.

Figure 2:
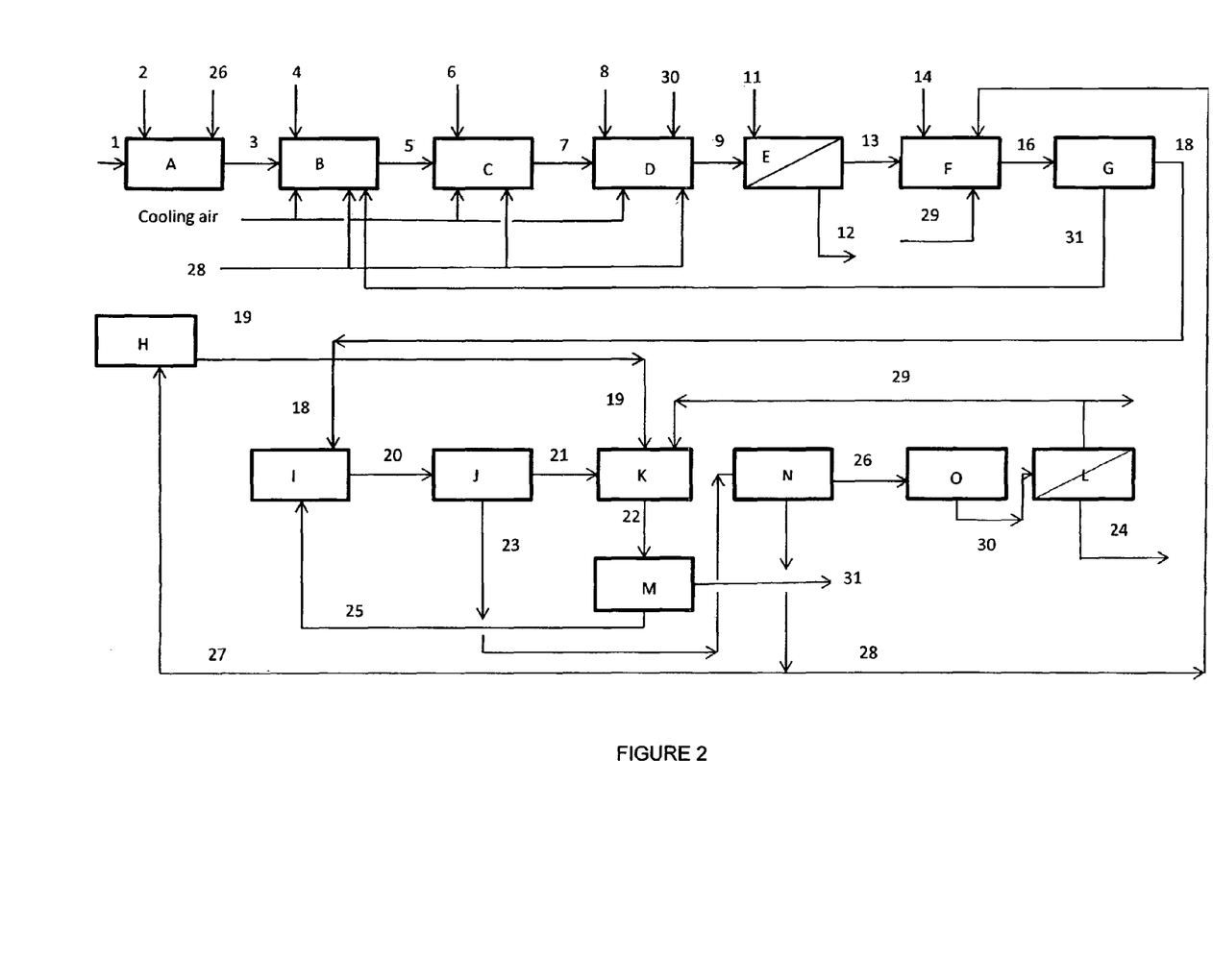

FIG. 2 shows zinc precipitation using a process that produces a zinc carbonate precipitate. In the process shown in FIG. 2, the PLS liquid 18 may be subsequently fed to re-treated solids reactor I. In this reactor, fresh PLS feed 18 is contacted with the precipitate formed in zinc precipitator K to remove any unreacted limestone. In reactor I, the dominating reaction is that of acid in the fresh PLS feed (18) (which contains zinc sulphate) and unreacted limestone. As such very little zinc is precipitated. The process can operate at a pH range of 4.5-5.5 but preferably 5.0 and at a temperature of from 70-90° C. The slurry from I, 20, is sent forward to thickener, J. The overflow from thickener J, 21, is sent forward to zinc precipitation with limestone K. The underflow from thickener J, 23, is sent forward for gravity separation, N, which may include a preceding step to polish any zinc from solution using hydrated lime. Returning now to zinc precipitator K, overflow 21 from thickener J, is contacted with limestone, 19, to precipitate zinc carbonate and gypsum also leaving unreacted limestone in the solids. The slurry 22 from zinc precipitator K, is sent to the zinc precipitate thickener, M. The overflow 31 of thickener M, may contain a small amount of dissolved zinc and can be recovered in the abovementioned hydrated lime polishing stage. The underflow 25 from thickener M, containing zinc carbonate, gypsum and unreacted limestone is returned to the residual limestone reactor, I.

The slurry 23 of liquid and precipitated solids from zinc carbonate precipitation step I is sent to zinc oxide separator N, which suitably may be in the form of a cyclone. In this separator N, the solids are separated into a fine overflow stream (e.g. sub 30 µm) 26 (which contains approximately 50% zinc and approximately 4 percent calcium, equating to 90 to 95% recovery of the zinc carbonate) and a coarse underflow stream (e.g. plus 30 µm stream) (which contains approximately 4% zinc and the bulk of the remainder being gypsum).

The zinc carbonate stream 26 is sent to zinc oxide thickener O. A flocculating agent may be added. The thickened zinc carbonate stream 30 obtained therefrom is sent to the zinc carbonate filter L. Wash water is used to wash the filter cake to remove any soluble magnesium and zinc which can be recycled to the process. The filtrate 29 is returned to the process in the absence of zinc polishing prior to filtration as there will still be some zinc in solution or a portion of the flow may be bled to control accumulation of deleterious minor elements such as magnesium. A zinc carbonate containing filter cake 24 is then sent to stockpile. The zinc carbonate filter cake may be sold as a concentrate suitable for recovery of zinc therefrom.

Returning now to the zinc carbonate separator N, the underflow is split into recycle streams 27 and 28. Stream 28 is returned to the iron polishing stage F for recovery of contained zinc and neutralisation duty. Stream 27 is recycled to permit seeding of the gypsum crystal facilitating improved separation of zinc carbonate and gypsum at the zinc carbonate separator.

The present invention provides a process that allows for the recovery of significant quantities of zinc from lead blast furnace slag, material that would otherwise be a waste material. Thus, the slag becomes a valuable resource that can improve the economics of the mining and smelting operations. The zinc is recovered from the lead smelting slag at greater than 95% recovery.

Figure 3:
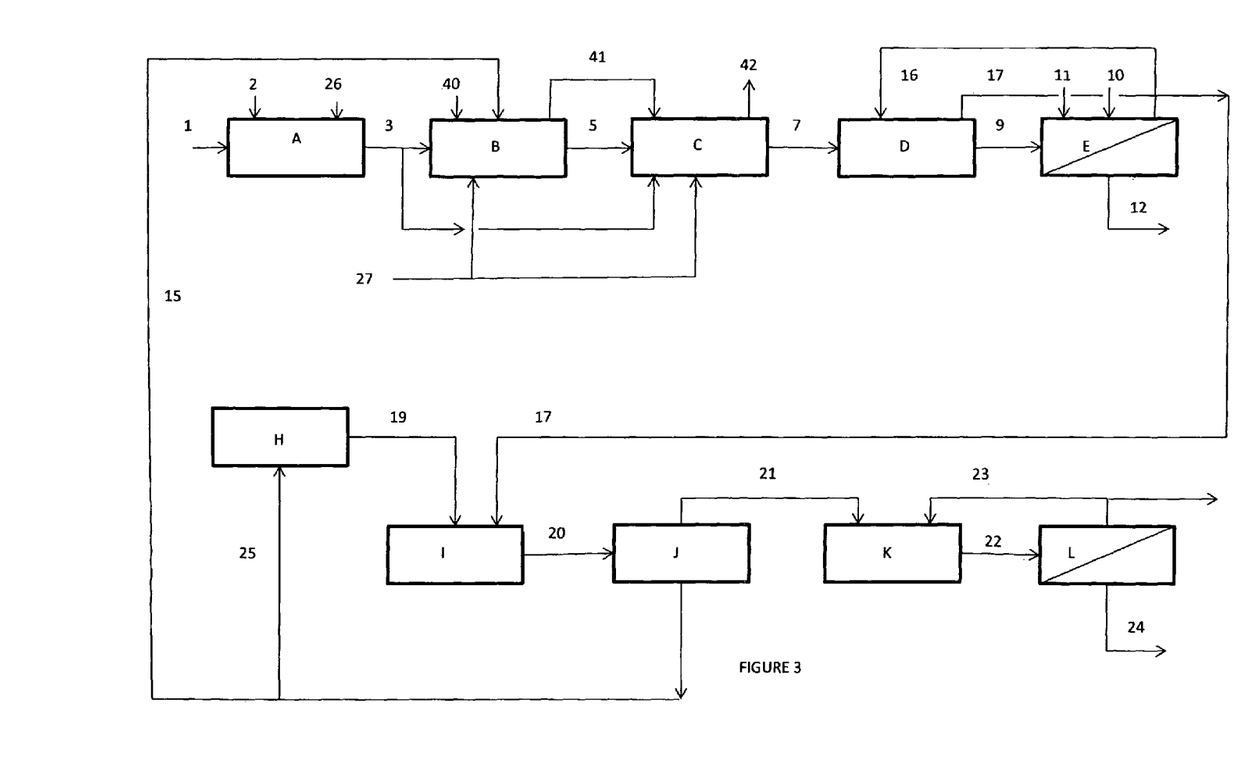
FIG. 3 shows a flowsheet of an embodiment of the process of the present invention where slag is leached with $SO_2$ in a gas scrubbing system.

Scrubbing $SO_2$ from a Gas Stream and Leaching Slag:

In FIG. 3, a grinding circuit A is supplied with water 1, and slag resulting from lead smelting operations. This slag is supplied directly from the lead smelter via stream 2 and/or from a stockpile of slag via stream 26.

A typical analysis of the slag being fed to the mill is as follows:

| | |
|---|---|
| Zn | 11-16% |
| Pb | 2.0-2.5% |
| Fe | 20.5-25.0% |
| Ca | 16.0-18.0% |
| Mg | 0.4-1.2% |
| Al | 0.6-1.0% |
| Si | 8.5-10.5% |
| Cu | 0.1-0.4% |

Throughout this specification, all percentages are given in terms of weight percent.

The slag that is fed to the grinding circuit A has a particle size distribution such that the $P_{80}$ of the slag is approximately 1300 µm. The mill grinds or crushes the slag such that the slag leaving the circuit has a particle size distribution such that the $P_{80}$ is approximately 65 µm.

After leaving the grinding circuit A, the slurry of water and ground slag 3 is sent to the scrubbing system vessels via a ring main. The scrubbing process is shown in two stages, namely, B and C, for the purpose of maximising scrubbing efficiency but it can be operated in one stage.

One possible embodiment is shown with leach stages B and C in which the leaching process is conducted in two separate process vessels. Gas stream 40 containing $SO_2$ enters the scrubbing stage B where it is contacted with slag slurry where a portion of the $SO_2$ is removed. The exit gas 41 from stage B enters scrubbing stage C for further scrubbing where the exit gas 42 from stage C is the final clean gas and is typically emitted to the atmosphere. The slurry 3 from grinding circuit A is fed to both scrubbing vessels B and C as required. Scrubbing slurry from stage B can be pumped to stage C and vice versa depending on the operating pH set-points in each scrubbing stage. $SO_2$ laden gas 40 is added to the first scrubbing stage only. Fresh slag slurry is added to both scrubbing stages B and C to regulate pH to a pre-set value. Air 27 may be added to both stages of scrubbing B and C to oxidise sulphites to sulphates and ensure the effective operation of the scrubbing system.

In this example, both scrubbing stages are operated at pH 4.0, but the two stages could be operated at different pH settings to optimise slag consumption and zinc extraction. The first stage of the scrubbing process is operated at a pH that falls between 3.0 and 4.0. This results in leaching of approximately 50 to 60% of the zinc contained in the slag. The acid also dissolves some of the iron in the slag and, in the first scrubbing stage, typically around 40% extraction of iron occurs. Furthermore, some of the magnesium, aluminium and manganese in the slag also dissolves in the first stage of the leaching process. $Fe^{3+}$ species dissolved in the first stage also precipitate in the first stage. $Fe^{2+}$ and $Zn^{2+}$ also dissolve in the first stage and remain soluble. The operating range of pH 3.0 to 4.0 results in the iron oxidising readily through the introduction of air and precipitating as an iron oxide/hydroxide. The solute in the first stage may have a dissolved zinc content of approximately 38 g per liter and a dissolved iron content of approximately 0.5 g per liter.

The reactions that occur in the scrubbing process are highly exothermic however the process will run autothermally at around 60° C.

In the first scrubbing stage, depending on the equipment size and liquid to gas ratio, the $SO_2$ scrubbing efficiency will be around 85%.

The residence time in the first scrubbing stage is typically around 10 to 24 hours based on the high recirculating load of scrubbing slurry in the scrubbing vessel.

The slurry from the first stage of the leaching process is then treated in the second stage of the leaching process or alternatively discharged to the thickener D. In, the second stage of the scrubbing process, the exit gas from stage B scrubbing is treated to remove further $SO_2$ from the gas stream. The pH in the second stage of the scrubbing process is typically around 4.0 in this example but could be lower to optimise zinc extraction and slag consumption with the first scrubbing stage. The temperature and the residence time in the second stage of the scrubbing process are generally similar to that used in the first stage of the scrubbing process (i.e. 90° C. and a residence time of at least 6 hours).

For reasons of maximising throughput of the process, it is desirable to use a specific silicon addition rate that is compatible with process stability and robustness. It is believed that a specific silicon addition rate of up to 10 g Si/l·h, more suitably up to 5 g Si/l·h, will produce acceptable processing. However, a specific silicon addition rate of up to 3.3 g Si/l·h is believed to produce further enhancements to process stability and robustness while still retaining a process report that is significantly higher than the prior art led slag leaching processes known to the inventor. Process residence time and slag feed rate can be adjusted to achieve the acceptable range of silicon addition rate. It is expected that due to process design the residence time in each scrubbing stage will be between 10 to 24 hours and result in acceptable silicon addition rates to both scrubbing stages.

Sufficient copper, present mainly as a sulphide, will also be leached from the slag to act as a catalyst for the oxidation of iron species.

The discharge slurry 7 from the scrubbing stages may have the following composition:

Solids:

| | |
|---|---|
| Zn | 3.0-5.0% |
| Pb | 1.0-2.0% |
| Fe | 11.0-16.0% |
| Ca | 11.0-16.0% |
| Mg | 0.01-0.2% |
| Al | 0.1-1.2% |
| Si | 6.0-8.0% |

Liquid:

| | |
|---|---|
| Zn | 30-45 g per litre |
| $Fe^{2+}$ | 0-0.1 g per litre |
| $Fe^{3+}$ | 0-1.0 g per litre |
| Ca | 0.1-0.5 g per litre |
| Mg | 1.5-2.5 g per litre |
| Al | 0.05-0.2 g per litre |
| Mn | 0.1-1.0 g per litre |
| Cu | 0.1-0.5 g per litre |
| Si | 0.1-0.3 g per litre |
| pH | 3.5-4.5 |

The slurry 7 from scrubbing is subsequently fed to the thickener D in which the first stage of solid liquid separation occurs. The thickener is fed a flocculant to aid particle settling. The thickener under flow 9 is directed to a filter for solid liquid separation step E. A flocculating agent may be added prior to solid/liquid separation. In the flow sheets shown in FIG. 3, solid/liquid separation step E utilises a filter to separate the solids from the liquid. A flocculating agent 10 may be added to assist in the filtration step. Wash water 11 is also used to wash the filter cake. Approximately 1-1.5 tonne of wash water is required for every tonne of solid to ensure 99% solution recovery.

The solid residue 12 from filter step E is recovered and used as mine fill. It has been found that the solid residue 12 has good qualities that enable it to be used as a mine fill. Indeed, the solids residue 12 has structural properties that are equivalent to about half those of cement. Therefore, it is believed that the solids residue has the potential to provide a replacement for approximately one third of the cement presently used for mine fill operations.

Advantageously in the process of the present invention, the leaching step utilised in the process results in the formation of precipitated silica compounds that have desirable filtering qualities and therefore do not deleteriously affect the filtering operation. This is in sharp contrast to previous attempts to recover zinc from lead smelting slag in which silica containing gels or colloidal silica containing particles were formed in a precipitation step and which proved to be very difficult to separate from the liquor.

The primary filtrate and the first wash are recycled back to the thickener D and the thickener overflow is taken as the Pregnant Leach Solution (PLS) 17 to feed the zinc precipitation stage I. The subsequent filter washes are collected and used as makeup water in the scrubbing and slag milling processes to achieve an overall higher zinc PLS tenor and reduce the downstream cost of zinc precipitation.

This PLS liquor is subsequently treated to recover zinc therefrom. Zinc may be recovered using any process known to be suitable to the person skilled in the art. There are two options provided in this instance. One is the zinc oxide precipitation method and the other is the zinc carbonate precipitation method. It will be appreciated that the present invention should not be considered to recovery of zinc using these two processes alone and that the present invention encompasses any other suitable processes known to recover zinc from solution.

FIG. 3 shows zinc recovery using zinc oxide precipitation. In FIG. 3, liquid 17 may be subsequently fed to zinc oxide precipitation I as described in U.S. Pat. No. 6,726,889, the entire contents of which are herein incorporated by cross reference. However it should be noted that different process conditions to those described in U.S. Pat. No. 6,726,889 are employed to prevent the precipitation of magnesium and magnesium reporting to the concentrate. The preferred process conditions are pH 6.5 at 70-90° C. In this step, lime 19 is added to the liquid. The lime may be hydrated lime ($Ca(OH)_2$) or lime (CaO). Steam may also be required for heating, but if CaO is added, the heat released by the exothermic hydration reaction to form $Ca(OH)_2$ may be sufficient to heat the solution to the desired temperature. Addition of the lime causes precipitation of zinc oxide. Gypsum will also be formed. Careful control of the precipitation parameters results in the zinc oxide forming with a crystal structure that allows for easy separation of the zinc oxide from the precipitated gypsum by virtue of differences in the size of the zinc oxide particles and the gypsum particles. This aspect of the zinc oxide precipitation process (to produce the zinc oxide precipitate with physical properties that allow for easy separation from gypsum) is well known to person is skilled in the art, but it is believed that the operating conditions to prevent precipitation of magnesium are unique.

The slurry 20 of liquid and precipitated solids from zinc oxide precipitation step I is sent to zinc oxide separator J, which suitably may be in the form of a cyclone. In this separator J, the solids are separated into a fine overflow stream (e.g. sub 30 μm) 21 (which contains approximately 50% to 70% zinc and approximately 2 percent calcium, equating to 95 to 99% recovery of the zinc oxide) and a coarse underflow stream (e.g. plus 30 μm stream) (which contains approximately 2% zinc and the bulk of the remainder being gypsum).

The zinc oxide stream 21 is sent to zinc oxide thickener K. A flocculating agent may be added. The thickened zinc oxide stream 22 obtained therefrom is sent to the zinc oxide filter L. Wash water is used to wash the filter cake to remove any soluble contaminants such as chlorine. The filtrate 23 is subsequently returned to the zinc oxide thickener K or a portion of the flow may be bled to control accumulation of deleterious minor elements. A zinc oxide containing filter cake 24 is then sent to stockpile. The zinc oxide filter cake may be sold as a concentrate suitable for recovery of zinc therefrom.

Returning now to the zinc oxide separator J, the underflow is split into recycle streams 15 and 25. Stream 15 is returned to the scrubbing stage B although this could also be used in an iron and aluminium polishing stage external to the scrubbing vessels as required. Stream 25 is recycled to permit seeding of the gypsum crystal facilitating improved separation of zinc oxide and gypsum at the zinc oxide separator. If hydrated lime slurry is used, stream 25 is recycled to the hydrated lime stock tank. If CaO is used, stream 25 is recycled to the zinc oxide precipitator.

The zinc carbonate precipitation process described above could also be utilised for the recovery of zinc from solution.

The process of this embodiment of the present invention may also offer the following additional advantages:

a) dust in the gas stream may also be removed as it passes through the scrubbing process;

b) elements in the dust may also be recovered to solution for subsequent recovery. These elements may include thallium and cadmium;

c) the process can deal with process surges and disruptions including changes in concentration and flow of feed gas.

d) the scrubber can use, in balance, the amount of slag that is generated at the blast furnace, or can consume more slag than is produced if a stockpile needs to be consumed.

Those skilled in the art will appreciate that the present invention may be susceptible to variations and modifications other than those specifically described. It will be understood that the present invention encompasses all such variations and modifications that fall within its spirit and scope.

What is claimed is:

1. A method for recovering zinc from slag derived from lead smelting comprising subjecting the slag to a leaching step under conditions in which zinc is dissolved into a solution, silica being added to the leaching step at a specific silicon addition rate of 10 g Si/L·hour or less, separating the solution from a solid residue and recovering zinc from the solution, wherein the specific silicon addition rate is expressed as tonnes per hour divided by the live volume of the leaching step expressed as cubic meters.

2. The method of claim 1, wherein the slag is ground or milled to reduce particle size of the slag so that the particle size is reduced such that $P_{80}$ is approximately from (a) 30 to 300 μm, (b) 30 to 150 μm, or (c) about 65 μm.

3. The method of claim 1, wherein the slag is subjected to acid leaching using a leachant comprising sulphuric acid.

4. The method of claim 1, wherein the leaching step comprises a single leaching stage.

5. The method of claim 1, wherein the leaching step is conducted in a first leaching stage that removes part of the zinc from the slag and a second leaching stage that removes further zinc and the first stage of the leaching process comprises adding a leaching agent in an amount that provides only a portion of overall acid demand.

6. The method of claim 5, wherein the leaching agent comprises an acid and the acid is added in an amount such that either (a) from 40% to 70%; (b) from 50% to 65%; or (c) around 60% of the zinc is extracted from the slag in the first leaching stage.

7. The method of claim 5, wherein the pH in the first leaching stage is controlled such that the pH falls in the range of (a) from 2.0 to 5.0 or (b) from about 3.0 to about 4.0.

8. The method of claim 7, wherein the first leaching stage is operated at a temperature that is below the boiling point of the solution; or the first leaching stage is operated at temperatures falling within the range of (a) 50° C. to 100° C., (b) from 70° C. to 95° C. or (c) about 90° C.

9. The method of claim 5, wherein the residence time in the first leaching stage is (a) at least 4 hours or (b) at least 6 hours.

10. The method of claim 5, wherein in the second leaching stage, the solids are further leached with a further leaching agent.

11. The method of claim 10, wherein the further leaching agent comprises acid.

12. The method of claim 11, wherein the acid is added to the slurry from the first leaching stage such that an excess of acid beyond the acid demand of the solids is used as the further leaching agent.

13. The method of claim 5, wherein the pH in the second leaching stage is (a) less than 2, (b) from 0.5 to 2.0, (c) from 0.5 to 1.5, or (c) around 1.0 which is equivalent to 15 g/L free sulphuric acid.

14. The method of claim 5, wherein the residence time in the second leaching stage is (a) at least 4 hours or (b) at least 6 hours.

15. The method of claim 5, wherein oxygen introduced in the second leaching stage to oxidise $Fe^{++}$ to $Fe^{+++}$ allowing the precipitation of some of the iron ions as jarosite.

16. The method of claim 5, wherein the second leaching stage is operated at a temperature that is below the boiling point of the solution; or the second leaching stage is operated at temperatures falling within the range of (a) 50° C. to 100° C., (b) from 70° C. to 95° C. or (c) about 90° C.

17. The method of claim 1, wherein the specific silicon addition rate, as calculated across all leaching stages is (a) 5 g Si/L·h. or less or (b) 3.3 g.Si/L·h. or less.

18. The method of claim 5, wherein the first leaching stage and the second leaching stage are conducted in separate vessels.

19. The method of claim 5, wherein the leaching step includes a treatment step to precipitate dissolved iron.

20. The method of claim 5, wherein the first and second leaching stages are conducted in the same vessel.

* * * * *